(12) United States Patent
Howarth et al.

(10) Patent No.: US 10,563,615 B2
(45) Date of Patent: Feb. 18, 2020

(54) GAS TURBINE ENGINE WITH THRUST REVERSER ASSEMBLY AND METHOD OF OPERATING

(71) Applicant: MRA Systems, LLC, Baltimore, MD (US)

(72) Inventors: Graham Frank Howarth, Middletown, DE (US); Andrew Michael Roach, Aberdeen, MD (US); Timothy Robert Beasman, Baldwin, MD (US)

(73) Assignee: MRA SYSTEMS, LLC, Wilmington, DE (US)

( * ) Notice: Subject to any disclaimer, the term of this patent is extended or adjusted under 35 U.S.C. 154(b) by 897 days.

(21) Appl. No.: 15/149,577

(22) Filed: May 9, 2016

(65) Prior Publication Data
US 2017/0321632 A1    Nov. 9, 2017

(51) Int. Cl.
*F02K 1/72* (2006.01)
*F02K 1/70* (2006.01)

(52) U.S. Cl.
CPC .................. *F02K 1/72* (2013.01); *F02K 1/70* (2013.01); *Y02T 50/672* (2013.01)

(58) Field of Classification Search
CPC ... F02K 1/70; F02K 1/72; F02K 1/763; F02K 1/625; F02K 1/62
USPC ....................................................... 60/226.2
See application file for complete search history.

(56) References Cited

U.S. PATENT DOCUMENTS

| | | |
|---|---|---|
| 3,475,913 A | 11/1969 | Mortlock et al. |
| 3,690,561 A | 9/1972 | Potter |
| 3,815,357 A | 6/1974 | Brennan |
| 4,073,440 A * | 2/1978 | Hapke ........................ F02K 1/74 239/265.29 |
| 4,137,711 A | 2/1979 | Montgomery |
| 4,519,561 A | 5/1985 | Timms |
| 4,591,097 A | 5/1986 | Thayer |
| 5,243,817 A | 9/1993 | Matthias |
| 5,794,434 A | 8/1998 | Szupkay |
| 5,983,625 A | 11/1999 | Gonidec et al. |
| 8,162,257 B2 | 4/2012 | Teulou |
| 8,418,954 B2 | 4/2013 | Allen |
| 8,720,818 B1 * | 5/2014 | Teulou .................... B64D 33/04 239/265.23 |

(Continued)

FOREIGN PATENT DOCUMENTS

| | | |
|---|---|---|
| CN | 102483011 A | 5/2012 |
| CN | 103375303 A | 10/2013 |

(Continued)

OTHER PUBLICATIONS

Office Action issued in connection with corresponding CA Application No. 2966039 dated Apr. 30, 2018.

(Continued)

*Primary Examiner* — Todd E Manahan
*Assistant Examiner* — Henry Ng
(74) *Attorney, Agent, or Firm* — McGarry Bair PC

(57) ABSTRACT

A gas turbine engine and thrust reverser assembly having a set of outer doors movable between a stowed position and a deployed position, where the set of outer doors extends outwards from the nacelle and a set of blocker doors movable between a stowed position and an deployed position, where the set of blocker door extends into an air flow conduit defined by the bypass duct to deflect air outwards.

20 Claims, 5 Drawing Sheets

(56) References Cited

U.S. PATENT DOCUMENTS

| | | | |
|---|---|---|---|
| 9,115,668 B2 | 8/2015 | Vauchel | |
| 9,181,898 B2 * | 11/2015 | Bhatt | F02K 1/72 |
| 2002/0124550 A1 | 9/2002 | Stretton | |
| 2004/0195443 A1 | 10/2004 | Lair | |
| 2005/0102996 A1 * | 5/2005 | Lair | E05B 47/0607 |
| | | | 60/226.2 |
| 2005/0151012 A1 * | 7/2005 | Lair | F02K 1/70 |
| | | | 244/110 B |
| 2006/0288688 A1 * | 12/2006 | Lair | F02K 1/386 |
| | | | 60/226.2 |
| 2016/0245232 A1 * | 8/2016 | MacKay | F02K 1/72 |

FOREIGN PATENT DOCUMENTS

| | | |
|---|---|---|
| FR | 2 354 453 A1 | 1/1978 |
| WO | 2008/045071 A1 | 4/2008 |

OTHER PUBLICATIONS

Extended European Search Report and Opinion issued in connection with corresponding EP Application No. 17169967.1 dated Oct. 5, 2017.

First office action and Search issued in connection with corresponding CN Application No. 201710333173.9 dated Aug. 28, 2018.

\* cited by examiner

GAS TURBINE ENGINE WITH THRUST REVERSER ASSEMBLY AND METHOD OF OPERATING

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct which diverts air from an aft direction to forward direction. The door assembly is deployed with an actuation assembly to release the door into the bypass duct.

Traditionally the door is part of a translating cowl requiring a separate actuator assembly which can add weight and take up valuable space within the engine. Thus, there is a need for a blocker door implementation which uses a smaller actuation system and reduces weight added to the engine.

BRIEF DESCRIPTION OF THE INVENTION

In one aspect of the present disclosure, a gas turbine engine includes a core engine, a nacelle surrounding at least a portion of the core engine, a bypass duct defined by and between the nacelle and the core engine and defining an air flow conduit, a set of outer doors movable between a stowed position and an deployed position, where the set of outer doors extends outwards from the nacelle, a set of blocker doors movable between a stowed position and an deployed position, where the set of blocker door extends into the air flow conduit to deflect air outwards, and an actuator assembly, and a link system operably coupling the actuator assembly to the set of outer doors and the set of blocker doors, wherein the set of blocker doors includes a greater number of doors than the number of doors in the set of outer doors and wherein during operation the actuator assembly is configured to engage the link system such that the set of outer doors and the set of blocker doors are simultaneously selectively moved between the stowed and deployed positions.

According to a second aspect of the present disclosure, a thrust reverser assembly for a gas turbine engine includes a set of outer doors movable between a stowed position and an deployed position, where the set of outer doors extends outwards from the nacelle, a set of blocker doors movable between a stowed position and an deployed position, where the set of blocker door extends into an air flow conduit defined by the bypass duct to deflect air outwards, and an actuator assembly, and a link system operably coupling the actuator assembly to the set of outer doors and the set of blocker doors, wherein the set of blocker doors includes a greater number of doors than the number of doors in the set of outer doors and wherein during operation the actuator assembly is configured to engage the link system such that the set of outer doors and the set of blocker doors are simultaneously selectively moved between the stowed and deployed positions.

According to a third aspect of present disclosure, a method of operating a thrust reverser system for an aircraft, includes simultaneously deploying, by a single actuator, a set of outer doors from a stowed position to a deployed position, where the set of outer doors extends outwards from a nacelle of a gas turbine engine of the aircraft and a set of blocker doors from a stowed position to a deployed position, where the set of blocker doors extends into an air flow conduit defined by a bypass duct defined by and between the nacelle and a core engine, and wherein the set of blocker doors includes a greater number of doors than the number of doors in the set of outer doors wherein the set of blocker doors and the set of outer doors redirect fan duct airflow causing the airflow to exit out and forward as guided by the deployed set of outer doors.

DETAILED DESCRIPTION OF THE INVENTION

Figure 1:
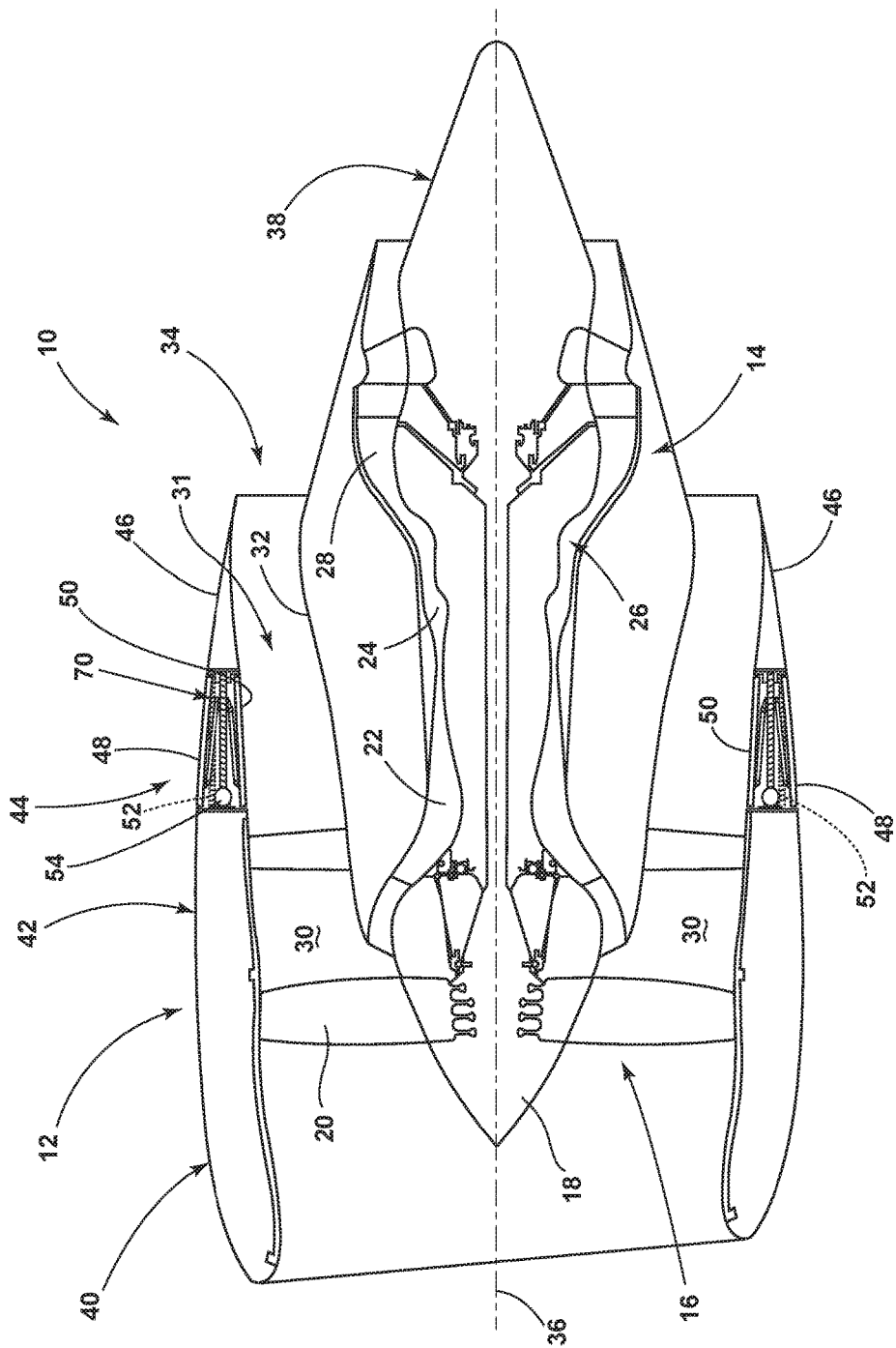
FIG. 1 is a schematic cross-sectional diagram of a gas turbine engine for an aircraft including a thrust reverser assembly in a stowed position in accordance with the present disclosure.

The described aspects of the present disclosure are directed to a thrust reverser assembly, particularly in a gas turbine engine. For purposes of illustration, the present disclosure will be described with respect to an aircraft gas turbine engine. It will be understood, however, that the present disclosure is not so limited and can have general applicability in non-aircraft applications, such as other mobile applications and non-mobile industrial, commercial, and residential applications.

Traditional thrust reversers for medium to large turbofan engines utilize a translating cowl design in which the translating cowl is pushed axially aft to expose the cascades. A series of blocker doors are rotated by this action to block the fan duct and redirect flow through the cascades, turning the flow forward to provide reverse thrust. The axial movement is typically achieved with a number of telescopic electrical, hydraulic or pneumatic actuators controlled and synchronized together.

Alternatively, a smaller number of thrust reversers utilize a pivoting door configuration where large external doors are pivoted into the external flow acting as a brake and the aft end of the door pivots into the fan duct, blocking and re-directing the fan flow based on the shape and angle of the door.

The thrust reverser of the present disclosure utilizes an actuator with a link carrier that moves axially and is connected to links that are connected to internal blocker doors and external doors. No axial cowl movement is required and internal and external doors open simultaneously. The translating cowl becomes a fixed cowl panel. The re-direction of the fan flow can be achieved using only the angle and shape of the internal and external doors, or can be combined with cascades.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically represents a gas turbine engine 10 including a nacelle 12 surrounding at least a portion of a core engine 14. The gas turbine engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the gas turbine engine 10 to generate additional engine thrust. The bypassed air passes through an annular-shaped bypass duct 30 defining a fore-to-aft airflow conduit or airflow conduit 31 between the nacelle 12 and an inner core cowl 32, and exits the bypass duct 30 through a fan exit nozzle 34. The inner core cowl 32 defines the radially inward boundary of the bypass duct 30, and provides a transition surface to a primary exhaust nozzle 38 that extends aft from the core engine 14. The nacelle 12 defines the radially outward boundary of the bypass duct 30. The bypassed fan air flows through the airflow conduit 31 before being exhausted through the fan exit nozzle 34.

The nacelle 12 can include three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42.

The thrust reverser assembly 44 includes three primary components: a set of outer doors 48 mounted to the nacelle 12 and adapted to extend outwards from stowed positions shown in FIG. 1, an optional cascade element 52 schematically represented in phantom within the nacelle 12, and a set of blocker doors 50 adapted to be pivotally deployed (FIG. 3) from a stowed position, shown in FIG. 1, where the blocker door 50 is radially inward from the cascade element 52.

The optional cascade element 52 can be a fixed structure of the nacelle 12, whereas the outer door 48 and the blocker door 50 are adapted to be moveable and are coupled to an actuator assembly 54. The inner core cowl 32 of the core engine 14 can be part of the thrust reverser assembly 44 if when pivoted into the bypass duct 30 the fore end of the blocker door 50 is pivoted towards the inner core cowl 32 when the blocker door 50 is fully deployed. Alternatively the fore end can be adjacent to or spaced from the inner core cowl 32.

While two outer doors 48 and blocker doors 50 are shown in FIG. 1, it will be understood that a set of outer doors 48 are typically circumferentially spaced around the nacelle 12 and a set of blocker doors 50 are circumferentially spaced about the core engine 14. In this manner it will be understood that the thrust reverser assembly 44 includes a set of outer doors 48 movable between a stowed position and an deployed position, where the set of outer doors 48 extends outwards from the nacelle 12 and a set of blocker doors 50 movable between a stowed position and an deployed position, where the set of blocker doors 50 extends into the airflow conduit 31 defined by the bypass duct 30 to deflect air outwards.

In traditional thrust reverser assemblies, a translating cowl portion is included and it translates aft to expose any included cascade elements. Conversely, in the present disclosure, a fixed outer cowl portion 46 is included in the nacelle. The fixed outer cowl portion 46 is aft of the outer door 48 and the blocker door 50. In this manner, the fixed outer cowl portion 46 can be considered integrated with the remainder of the nacelle 12. The fixed outer cowl portion 46 can also provide housing for the actuator assembly 54.

Figure 2:
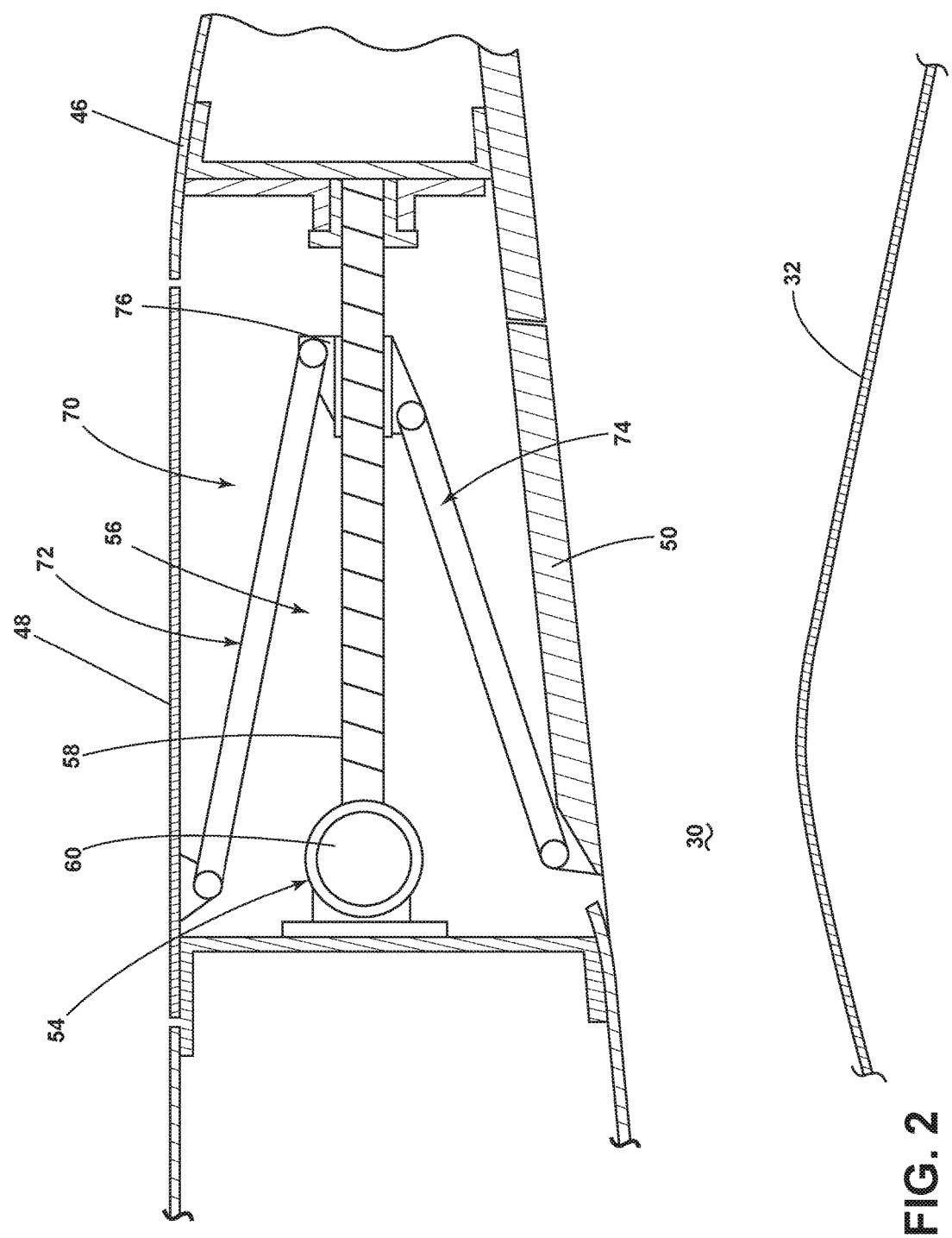
FIG. 2 is a cross-sectional view of the thrust reverser assembly from FIG. 1 in the stowed position.

FIG. 2 illustrates a cross-sectional view of a portion of the thrust reverser assembly 44 in which the outer doors 48 and blocker doors 50 are in a stowed position. The cascade element has been removed for illustrative purposes to allow a clearer view of the actuator assembly 54 and link assembly or link system 70. Portions of the nacelle 12 including the fixed outer cowl portion 46 can provide structural support for portions of the thrust reverser assembly 44. For example, as illustrated example the fixed outer cowl portion 46 provide an aft support for the actuator assembly 54, which improves the structural efficiency and reduces weight of the system because additional supports are not necessary.

A ball-screw or screw jack actuator 56 can be included in the actuator assembly 54. As illustrated a longitudinally-oriented threaded rod 58 and a rotation mechanism 60 for causing rotational motion of the threaded rod 58 can be included in the screw jack actuator 56. The rotation mechanism 60 can be any suitable mechanism for causing rotation of the threaded rod 58. For example the rotation mechanism can be a motor having an output operably coupled to the threaded rod 58. It will be understood that the screw jack actuator 56 can be electric, hydraulic or pneumatic motor driven. Electric driven can provide simplicity of installation and control.

The rotation mechanism 60 of the screw jack actuator 56 can be coupled to a control circuit or control module (not shown) that provides for controlling this screw jack actuator 56 from the cockpit to move the set of outer doors 48 and the set of blocker doors 50 between the stowed position and deployed positions.

The link system 70 operably couples the actuator assembly 54 to the set of outer doors 48 and the set of blocker doors 50. More specifically, a first link section 72 is illustrated as being operably coupled to the set of outer doors 48 and a second link section 74 is illustrated as being operably coupled to the set of blocker doors 50. The first link section 72 and the second link section 74 act as driving links connected to the set of outer doors 48 and the set of blocker doors 50.

Figure 3:
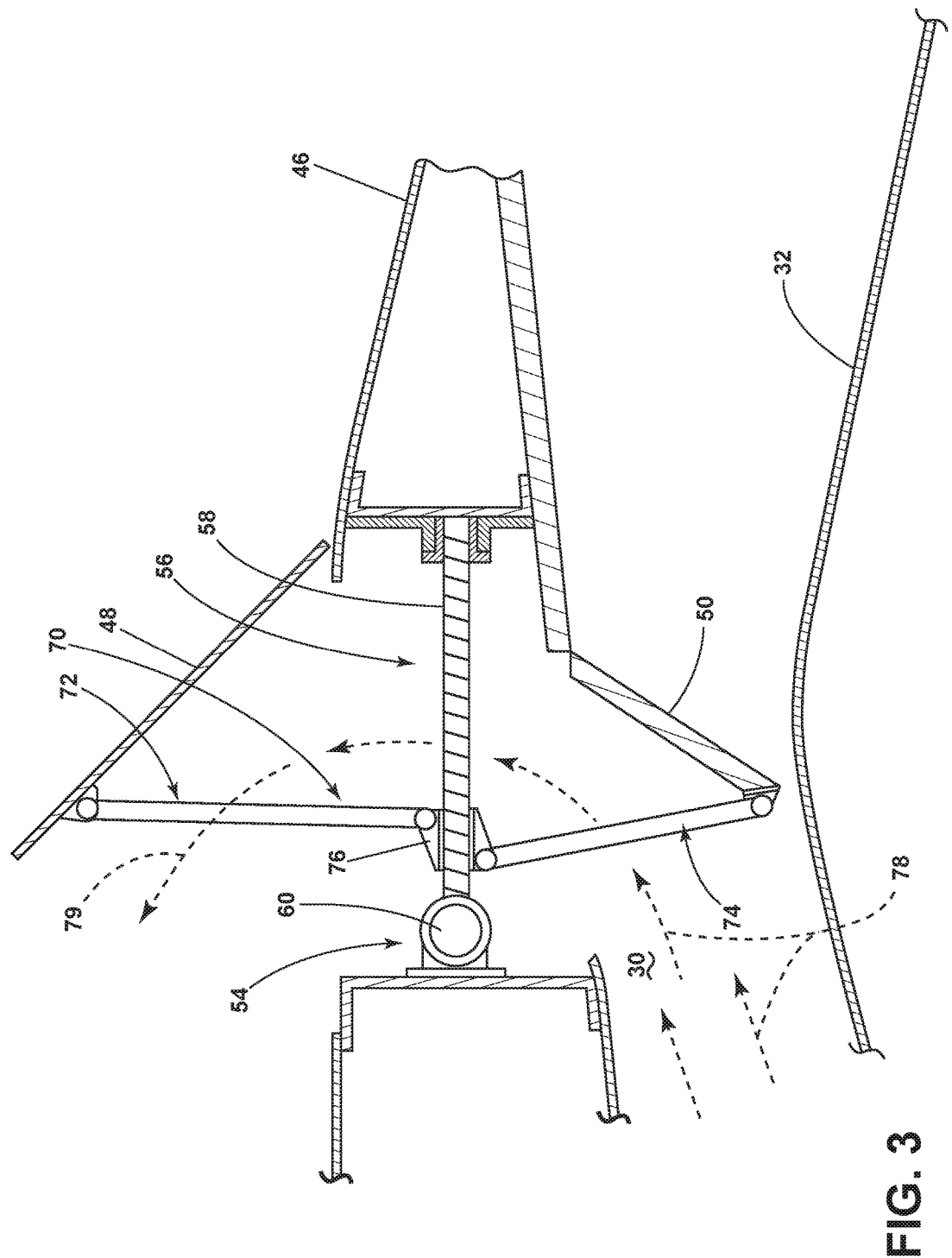
FIG. 3 is a cross-sectional view of the thrust reverser assembly from FIG. 1 in a deployed position.

A link carrier or carrier 76 is also included in the link system 70 and operably couples the first link section 72 and the second link section 74 to the screw jack actuator 56. The carrier 76 can be any suitable mechanism or carriage that is held upon the threaded rod 58 of the screw jack actuator 56. The carrier 76 is mechanically attached to the first link section 72 and the second link section 74. The carrier 76 can be configured to be displaced longitudinally along the threaded rod 58 between a position located on the aft side of said threaded rod 58 in which the set of outer doors 48 and the set of blocker doors 50 are in the stowed position and a position located on the fore side of threaded rod 58 in which the set of outer doors 48 and the set of blocker doors 50 are in the deployed position, as shown in FIG. 3 (again with the cascade element not illustrated for clarity).

Figure 4:
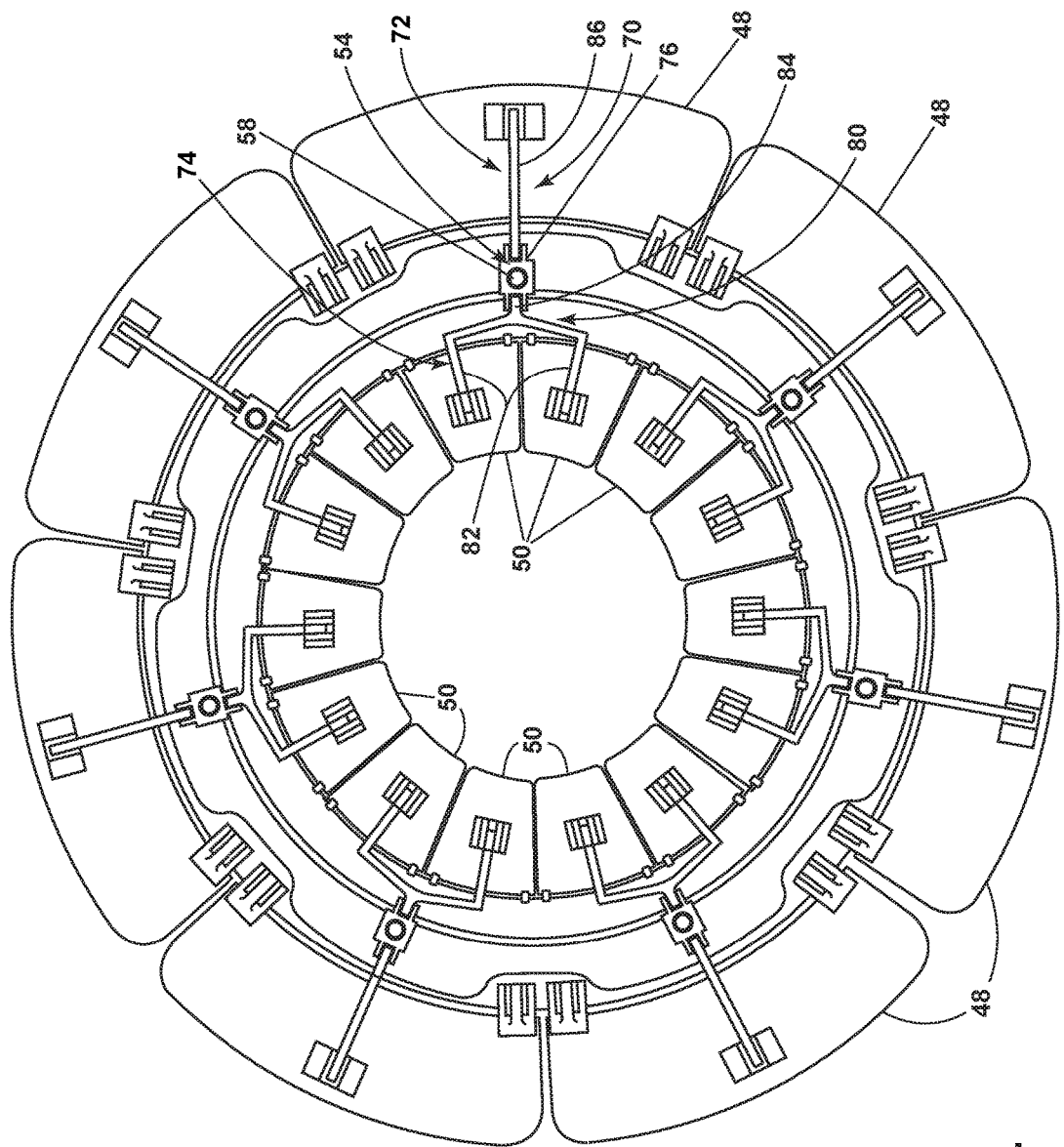
FIG. 4 is a schematic front view of portions of the thrust reverser assembly of FIG. 3.

FIG. 4 is an additional view illustrating the outer doors 48 and the blocker doors 50 circumferentially located about the nacelle 12. FIG. 4, illustrates that there are multiple sets of actuator assemblies 54, link systems 70, sets of outer doors 48, and sets of blocker doors 50 spaced circumferentially about the nacelle 12. Also made more clear is that the second link section 74 operably couples two blocker doors 50 to the carrier 76 while the first link section 72 operably couples a single outer door 48 to the carrier 76.

It will be understood that the first link section 72 and second link section 74 can be configured in any suitable manner such that the set of outer doors 48 and the set of blocker doors 50 is moveably coupled with the actuator assembly 54. In the illustrated example, the second link section 74 includes a linkage element in the form of a forked connector 80 having a set of tines 82 and a main rod 84. A tine 82 can be rotatably coupled to one of the set of blocker doors 50. It will be understood that any number of tines can be included to couple any number of blocker doors 50 through the main rod 84 to the carrier 76. The main rod 84 can also be rotatably coupled to the carrier 76. The second link section 74 is illustrated as including a linkage element in the form of a dual-hinged connecting rod 86. The connecting rod 86 rotatably links the set of blocker doors 50, shown as linking a lateral edge of a single blocker door 50, and the carrier 76.

In this manner, the screw jack actuator 56 can be operably coupled to both the set of outer doors 48 and the set of the blocker doors 50. In this manner, the link system 70 is configured such that the two blocker doors 50 and a single outer door 48 are moved in tandem. Further, it will be understood that the set of blocker doors 50 included in the thrust reverser assembly 44 includes a greater number of doors than the number of doors in the set of outer doors 48. As the blocker doors 50 are anticipated as being actuated by tandem links of the link system 70, the number of actuators required is limited.

The geometry, quantity of doors and actuators and efficiency of the installation is determined by the performance requirements of a specific installation in conventional manner. It is anticipated that typical geometry can result in two or three outer doors 48 per half of the thrust reverser assembly with double or more that number of blocker doors 50 to achieve good blocking efficiency. The lesser number of outer doors 48 can provide for less gaps and steps and aerodynamic braking does not suffer substantially during operation.

Referring back to FIG. 2, on command, the rotation mechanism 60 rotates the threaded rod 58 and displaces the carrier 76 along the threaded rod 58. The carrier 76 can be displaced longitudinally along the threaded rod 58 between a position located on the aft side of said threaded rod 58 in which the set of outer doors 48 and the set of blocker doors 50 are in the stowed position and a position located on the fore side of threaded rod 58 in which the set of outer doors 48 and the set of blocker doors 50 are in the deployed position (FIG. 3).

By way of further explanation when thrust forces are desired, the screw jack actuator 56 is rotated driving the carrier 76 forward and pulling and rotating the first link section 72 and the second link section 74, which then rotate, respectively, the set of outer doors 48 and set of the blocker doors 50 into the external and internal air stream simultaneously. The set of blocker doors 50 causes the air to flow radially outboard, including through cascades which turn the flow forward. The aperture created by the set of outer doors 48 opening allows this re-directed air to exit flowing forward and the air is further guided by the door which also provides increase retarding force resulting from its aerodynamic drag.

The screw jack actuator 56 can be configured to selectively move the outer door 48 between the stowed position (FIG. 2) and the deployed position (FIG. 3) to an angle which can be, by way of non-limiting example, between 25 and 48 degrees. The deployed position (FIG. 3) exposes the cascade element 52 and allows the outer door 48 to act as an air brake causing an increase in drag or force acting opposite the relative motion of the gas turbine engine 10.

The screw jack actuator 56 can also selectively move the blocker door 50 from the stowed position (FIG. 2) to the deployed position (FIG. 3), where it rests at an angle adjacent to the inner core cowl 32 to decrease stress produced by fan duct airflow 78. In a fully deployed position (FIG. 3), the blocker door 50 substantially blocks the fan duct airflow 78 from passing through the airflow conduit 31. Instead, air within the bypass duct 30 is redirected towards the exposed cascade element 52 providing a thrust reversal effect by redirecting the fan duct airflow 78 within the bypass duct 30 to exit out and forward through the cascade element 52 becoming a reverse thrust flow 79. Redirecting the bypassed air into a forward direction produces a force in the opposite direction of travel to ensure deceleration. It is contemplated that the movement of the outer door 48 and the blocker door 50 can be done simultaneously or sequentially.

Figure 5:
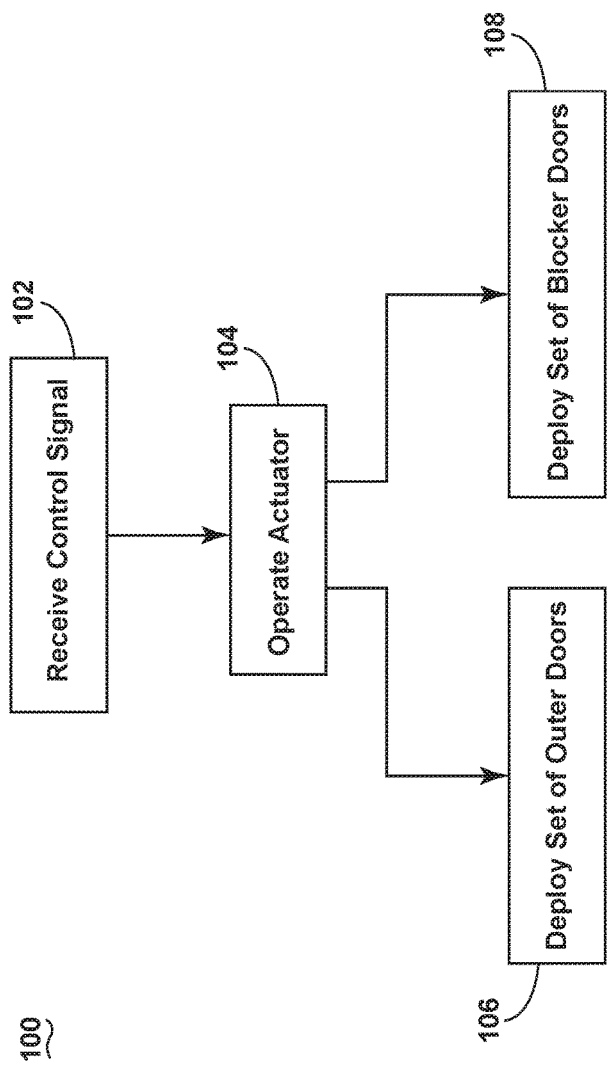
FIG. 5 is an example flow chart diagram, demonstrating a method for operating a thrust reverser system for an aircraft in accordance with various aspects described herein.

In this manner, the previously described gas turbine engine 10 and thrust reverser assembly 44 can be used to implement one or more embodiments of a method according to the present disclosure. For example, FIG. 5 illustrates a flow chart of a method 100 of operating a thrust reverser, such as the thrust reverser assembly 44. The method 100 begins at 102 when a control signal for the thrust reverser assembly 44 is received at 102. The control signal can be initiated by a user including, but not limited to, a pilot in the cockpit of the aircraft or by a flight system within the aircraft. The control signal can be received by a control system for the aircraft or a control module specifically for the thrust reverser assembly 44 including a control module (not shown) for the rotation mechanism 60. At 104, the actuator assembly 54 is operated. More specifically, the screw jack actuator 56 is rotated and the link system 70 is engaged such that the set of outer doors 48 and the set of blocker doors 50 are simultaneously selectively moved from the stowed position to the deployed position as indicated at 106 and 108.

The sequence depicted is for illustrative purposes only and is not meant to limit the method 100 in any way as it is understood that the portions of the method can proceed in a different logical order, additional or intervening portions can be included, or described portions of the method can be divided into multiple portions, without detracting from embodiments of the present disclosure. For example, the method 100 can simply include simultaneously deploying a set of outer doors 48 from a stowed position to a deployed position, where the set of outer doors 48 extend outwards from a nacelle 12 of a gas turbine engine 10 of the aircraft and a set of blocker doors 50 from a stowed position to a deployed position, where the set of blocker doors 50 extend into the airflow conduit 31 defined by the bypass duct 30 defined by and between the nacelle 12 and a core engine 14, wherein the set of blocker doors 50 includes a greater number of doors than the number of doors in the set of outer doors 48, and wherein the set of blocker doors 50 and the set of outer doors 48 redirect fan duct airflow causing the airflow to exit out and forward as guided by the deployed set of outer doors 48. Deploying the set of blocker doors can include deploying multiple blocker doors through a link system, such as by way of non-limiting example the link system 70. Further, if a cascade element is present the set of blocker doors 50 can deflect air through the cascade element.

The thrust reverser assembly disclosed herein provides multiple benefits, which can positively impact cost, performance and aircraft controllability. First, the actuator overall length and stroke can be significantly reduced from conventional designs resulting in reduced cost and weight. The use of external doors adds an additional drag provided retarding force which can be utilized to increase reverse thrust performance or can be used to offset the implementation of shorter cascades for the same reverse thrust and thereby reduce the length of the overall cowl installation with commensurate reduction in-flight drag. Further, the present disclosure results in overall simplified installation and control systems as well as reduced packing volume needs in the fan cowl compartment area with potential for reduced size and weight.

The present disclosure also provides the flexibility for individual control and operation of the actuators, external doors and associated inner doors, which means the external reverse thrust flow can be more readily tailored to a specific aircraft or engine installation including over-wing or installations close to fuselage, ground, or wing. In addition using blocker door links housed in-flight in the cowl cavity and not in the fan duct provides reduced in-flight drag with a related improvement in specific fuel consumption. Thus, the present disclosure also allows improved fan duct aero lines with associated aerodynamic drag reductions. These combined benefits will be manifested as reduced specific fuel consumption or improved engine performance versus a conventional thrust reverser.

Benefits to implementing such a thrust reverser include an efficient packaging of a system that can replace a conventional linearly translated thrust reverser. Space required for translating the translating cowl aft is no longer necessary, allowing for additional space within the outer cowl for mounting the accessories necessary for implementing the actuator assembly.

It should be appreciated that the operation of the thrust reverser assembly is not dependent on any particular type of cascade design, and in fact the present disclosure could be installed in a non-cascade reverser design in which the bypassed air is diverted from the bypass duct through openings of various configurations. Furthermore, whereas the set of outer doors and the set of blocker doors are shown with a rigid construction that does not intentionally bend, flex or fold during its deployment, doors having any of these capabilities are also within the scope of the present disclosure. Finally, it should also be appreciated that the thrust reverser assembly and its individual components can be constructed of various materials, including metallic, plastic and composite materials commonly used in aerospace applications and fabricated by machining, casting, molding, lamination, etc., and combinations thereof.

In any of the above various aspects, a protective coating, such as a thermal barrier coating, or multi-layer protective coating system can be applied to the cowls or engine components. The various aspects of systems, methods, and other devices related to the present disclosure disclosed herein provide an improved thrust reverser assembly, particularly in a fan cowl.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine, comprising:
    a core engine defining a center longitudinal axis;
    a nacelle surrounding at least a portion of the core engine;
    a bypass duct defined by and between the nacelle and the core engine and defining an air flow conduit;
    a set of outer doors movable between a stowed position and a deployed position, where the set of outer doors extends outwards from the nacelle;
    a set of blocker doors movable between a stowed position and a deployed position, where the set of blocker doors extends into the air flow conduit to deflect air outwards;
    an actuator assembly; and
    a link system including a link carrier coupled to the actuator assembly; a first link extending from the link carrier to the set of outer doors and a second link section extending from the link carrier to the set of blocker doors;
    wherein the set of blocker doors includes a greater number of doors than the number of doors in the set of outer doors, and
    during operation the actuator assembly is configured to engage the link system by moving the link carrier longitudinally such that the set of outer doors and the set of blocker doors are simultaneously selectively moved between the stowed and deployed positions.

2. The gas turbine engine of claim 1 wherein the actuator assembly comprises a screw jack.

3. The gas turbine engine of claim 2 wherein the link carrier operably couples the first link and the second link to the screw jack.

4. The gas turbine engine of claim 3 further comprising a threaded rod along which the link carrier moves longitudinally.

5. The gas turbine engine of claim 1 wherein the second link operably couples two blocker doors such that the two blocker doors move in tandem.

6. The gas turbine engine of claim 1 wherein the link system operably couples two blocker doors and a single outer door to the actuator assembly.

7. The gas turbine engine of claim 6 wherein there are multiple sets of actuator assemblies, link systems, outer doors, and blocker doors spaced circumferentially about the nacelle.

8. The gas turbine engine of claim 1, further comprising a cascade element located within the nacelle.

9. The gas turbine engine of claim 1 wherein the nacelle comprises an outer cowl portion aft of the set of outer doors and the set of blocker doors and wherein the outer cowl portion is fixed.

10. A thrust reverser assembly for a gas turbine engine including a core engine, a nacelle surrounding at least a portion of the core engine to define a bypass duct between the nacelle and the core engine, including:
a set of outer doors movable between a stowed position and a deployed position, where the set of outer doors extends outwards from the nacelle;
a set of blocker doors movable between a stowed position and a deployed position, where the set of blocker doors extends into an air flow conduit defined by the bypass duct to deflect air outwards;
an actuator assembly; and
a link system including a link carrier coupled to the actuator assembly; a first link extending from the link carrier to the set of outer doors and a second link extending from the link carrier to the set of blocker doors;
wherein the set of blocker doors includes a greater number of doors than the number of doors in the set of outer doors, and
during operation the actuator assembly is configured to engage the link system by moving the link carrier longitudinally such that the set of outer doors and the set of blocker doors are simultaneously selectively moved between the stowed and deployed positions.

11. The thrust reverser assembly of claim 10 wherein the actuator assembly comprises a screw jack.

12. The thrust reverser assembly of claim 11 wherein the link carrier operably couples the first link and the second link to the screw jack.

13. The thrust reverser assembly of claim 10 wherein the second link operably couples two blocker doors such that the two blocker doors move in tandem.

14. The thrust reverser assembly of claim 10 wherein the link system operably couples two blocker doors and a single outer door to the actuator assembly.

15. The thrust reverser assembly of claim 10 wherein there are multiple sets of actuator assemblies, link systems, outer doors, and blocker doors spaced circumferentially about the nacelle.

16. A method of operating a thrust reverser system for an aircraft, comprising:
simultaneously deploying, by a single actuator moving a link carrier longitudinally, a set of outer doors from a stowed position to a deployed position via a first link extending from the single carrier, where the set of outer doors extend outwards from a nacelle of a gas turbine engine of the aircraft and a set of blocker doors from a stowed position to a deployed position via a second link section extending from the single carrier, where the set of blocker doors extends into an air flow conduit defined by a bypass duct defined by and between the nacelle and a core engine;
wherein the set of blocker doors includes a greater number of doors than the number of doors in the set of outer doors, and
the set of blocker doors and the set of outer doors redirect fan duct airflow causing the airflow to exit out and forward as guided by the deployed set of outer doors.

17. The method of claim 16 wherein the set of blocker doors deflects air through a fixed cascade element.

18. The method of claim 16 wherein the first link and the second link are tandem links deploying two blocker doors and a single outer door in tandem.

19. The method of claim 16 further comprising rotating the single actuator to cause longitudinal movement of the link carrier.

20. The method of claim 16 further comprising deploying the first link and the second link in a radial direction.

* * * * *